United States Patent

Hanaway

Patent Number: 5,141,337
Date of Patent: Aug. 25, 1992

[54] GUIDE POST, GUIDE SLEEVE AND AIR IMPULSE ROTARY BALL CAGE

[76] Inventor: Ronald L. Hanaway, 30210 E. Eight Mile Road, Farmington Hills, Mich. 48236

[21] Appl. No.: 802,825

[22] Filed: Dec. 6, 1991

[51] Int. Cl.$^5$ .............................................. F16C 29/04
[52] U.S. Cl. .................................. 384/49; 29/898.03; 384/12
[58] Field of Search ............. 384/12, 49, 29, 30, 384/51, 523; 29/898.03, 898, 898.06, 898.067

[56] References Cited

U.S. PATENT DOCUMENTS

| | | | |
|---|---|---|---|
| 2,774,430 | 12/1956 | Blazek | 384/30 |
| 2,846,278 | 8/1958 | Blazek | 384/30 |
| 2,987,348 | 6/1961 | Blazek | 384/30 |
| 3,092,425 | 6/1963 | Connor | 384/30 |
| 3,357,755 | 12/1967 | Danly | 384/49 |
| 3,514,166 | 5/1976 | Coley | 384/49 |
| 3,752,540 | 8/1973 | Bosworth | 384/30 |
| 4,648,727 | 3/1987 | O'Neil | 384/49 |
| 4,664,534 | 5/1987 | Hanaway | 384/49 |
| 5,051,002 | 9/1991 | Hanaway | 384/49 |
| 5,054,937 | 10/1991 | Hanaway | 384/49 |

*Primary Examiner*—Thomas R. Hannon
*Attorney, Agent, or Firm*—Dykema Gossett

[57] ABSTRACT

In combination, a guide post, a coaxial ball bearing cage adjustably receiving the guide post and adapted for longitudinal and rotary movements. A coaxial guide sleeve adjustably receives the cage and post. An apertured cap loosely received the cage and is mounted and retained upon the guide sleeve, and has an inlet adapted for connection to a pressurized air source. Pressurized air is directed from the source into the cap for impingement upon the cage for rotating the cage relative to the sleeve.

20 Claims, 3 Drawing Sheets

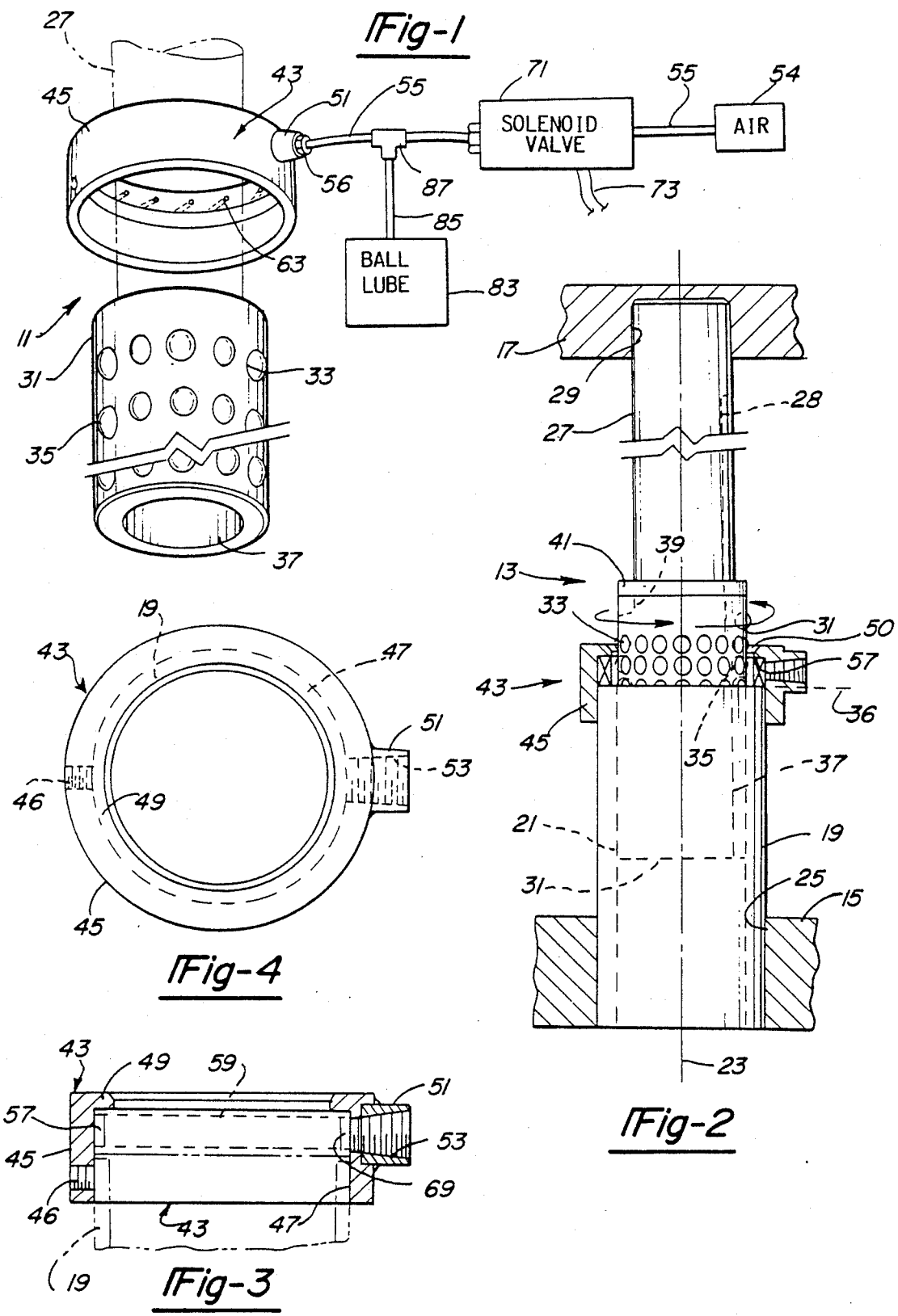

GUIDE POST, GUIDE SLEEVE AND AIR IMPULSE ROTARY BALL CAGE

FIELD OF INVENTION

The present invention relates to the assembled guide post, guide sleeve and ball bearing cage, such as may be used with a die set assembly.

BACKGROUND OF THE INVENTION

In the guide sleeve, guide post and bearing assembly of U.S. Pat. No. 4,664,534 dated May 12, 1987, of the present inventor, one disadvantage of that construction was the predictability and extent of relative rotary movement of the ball cage with respect to the guide post to prevent tracking of the balls along the surface of the guide post and guide sleeve.

In said earlier patent possibly others, as for example, U.S. Pat. No. 4,648,727, it was believed advantageous to have some relative rotary movement of the ball cage with respect to the guide post and sleeve. This related to rotation of the ball bearing assembly with respect to the axially related guide post and the external guide sleeve to avoid tracking thereupon by the bearings.

THE PRIOR ART

Listed below are additional samples of patents relating to the general continuation of a guide post, guide sleeve and a ball bearing assembly.

| PATENT NO. | NAME | DATE |
| --- | --- | --- |
| 2,774,430 | W. J. Blazek | December 18, 1956 |
| 2,846,278 | W. T. Blazek | August 5, 1958 |
| 2,987,348 | W. T. Blazek | June 6, 1961 |
| 3,092,425 | G. O. Conner | June 4, 1963 |
| 3,357,755 | J. C. Danly | December 12, 1967 |
| 3,514,166 | S. E. Coley | May 26, 1970 |
| 3,752,540 | D. Bosworth | August 14, 1973 |
| 4,648,727 | J. O'Neil | March 10, 1987 |
| 4,664,534 | R. Hanaway | May 12, 1987 |

Previously with guide post, guide sleeve and ball bearing assemblies there was not known any means for positively assuring incremental rotary movements of the ball cage or ball bearing assembly with respect to the guide post and guide sleeve.

SUMMARY OF THE INVENTION

An important feature of the present invention is to provide in combination with a guide post, a guide sleeve and a ball bearing cage of a mechanical or other means for effecting relative rotary movement of the ball cage with respect to the guide post and guide sleeve.

Another feature is to provide in combination with a guide post having a longitudinal axis, a cylindrical ball bearing cage coaxially mounted thereon adapted for relative longitudinal movements and further adapted for relative rotary movements thereon. A coaxial guide sleeve is adapted to receive the cage and guide post. A coaxial apertured cap having a bore loosely receives the ball cage and is mounted over the guide sleeve and retained thereon. The cap has an inlet to its bore adapted for connection to a compressed air source. The compressed air source is adapted to direct pressurized air towards surface portions of the ball bearing cage to such extent as to mechanically rotate the ball bearing cage on its axis and with respect to the guide sleeve and guide post.

As another feature there is incorporated within the bore of said cap an apertured turbine ring fixed therein loosely surrounding the cage. Said ring includes a plurality of angularly related turbine openings for receiving pressurized air from the cap inlet and for impinging pressurized air at an acute angle to and around said cage for rotating said cage relative to said guide post and sleeve.

As another feature there is provided a normally closed valve means interposed upon the tube conducting pressurized air to said cap. The valve means when opened feeds compressed air to the turbine openings within said cap.

As a further feature the valve means may be in the form of a solenoid control valve or other air valve electrically controlled or may be a manual control valve.

As another feature there is provided an electrical circuit connected to a power source, and to said valve means to intermittently energize and open said valve means.

As another feature the electrical circuit includes a preset adjustable timer switch adapted to deactivate the valve means after a preset period.

As another feature the electrical circuit includes a normally open counterswitch for closing the circuit after a preset number of relative movements between the post and the sleeve. This may be used in a die set, for illustration, including relatively movable upper and lower die shoes.

As still another feature the electrical circuit includes a normally open proximity or limit switch located adjacent an elevated point of the guide post, adapted to close after partial separation of the post and sleeve sufficient to release the preload between the post, ball cage and sleeve.

As still another feature of the present invention there is incorporated within the cap which receives the ball bearing cage an air impeller assembly connected to a source of pressurized air, adapted for directing pressurized air at an acute angle to exterior surface portions of the ball cage for rotating the ball cage relative to said sleeve and post.

These and other features and objects will be seen from the following specification and claims in conjunction with the appended drawings.

THE DRAWINGS

FIG. 1 is a fragmentary perspective view of the present air impulse rotary ball cage assembly.

FIG. 2 is a fragmentary side elevational view of the present guide post, guide sleeve and air impulse ball bearing assembly.

FIG. 3 is a side elevational view of the air cap shown in FIG. 2, and on an increased scale.

FIG. 4 is a plan view thereof.

Figure 6:
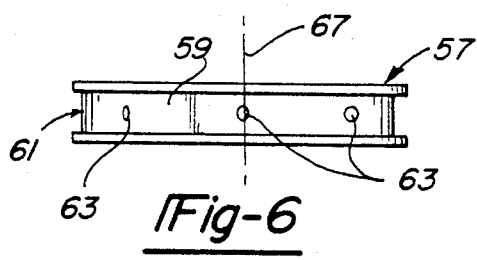

FIG. 6 front elevational view thereof.

Figure 7:
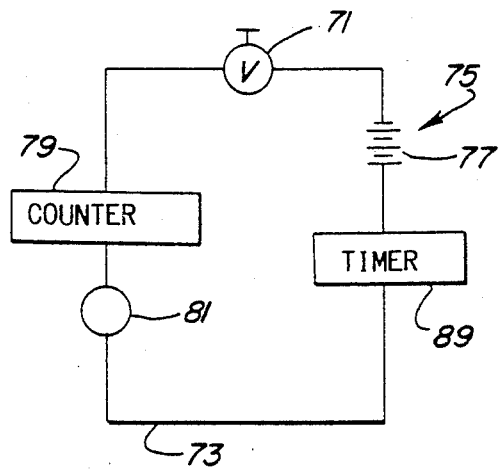

FIG. 7 is a schematic electrical diagram of the electrical circuit involving a power source, air valve, timer switch, counterswitch and proximity switch.

Figure 8:
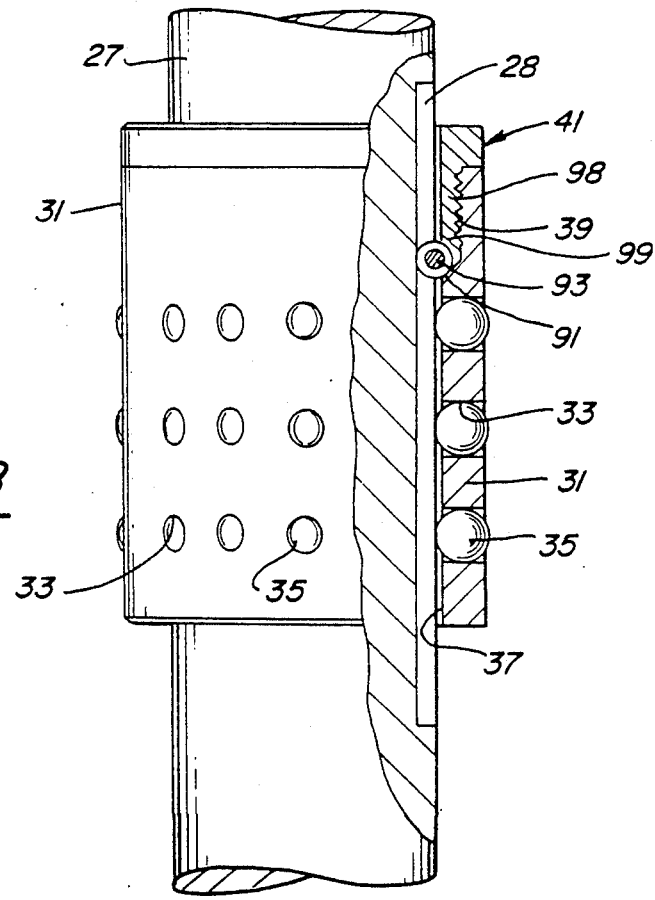

FIG. 8 is a fragmentary longitudinal section of a portion of the assembly shown in FIG. 2, on an increased scale and with respect to mounting of the cap upon one end of the ball retainer.

Figure 9:
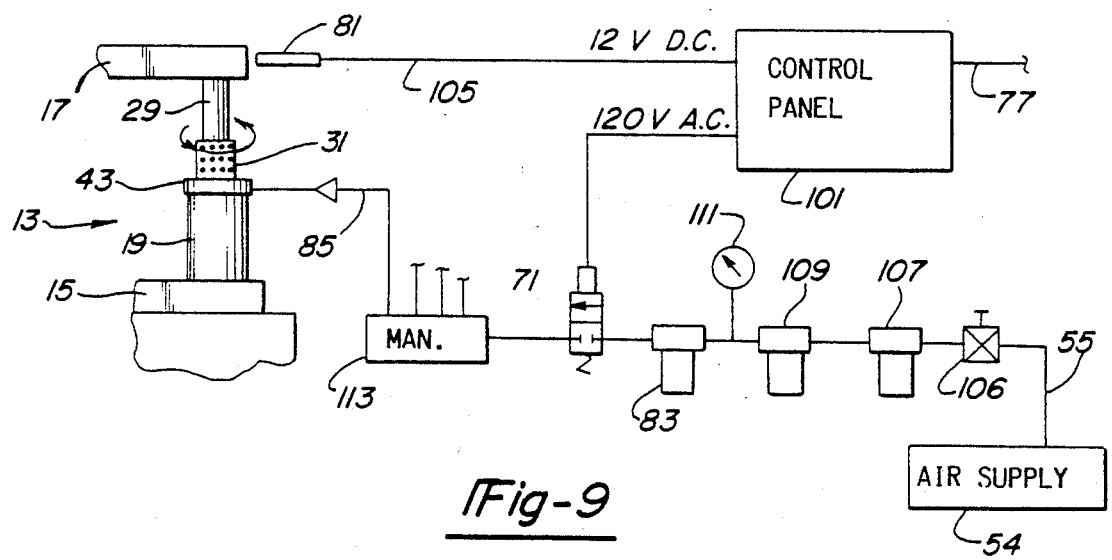

FIG. 9 is a schematic mechanical diagram of the present assembly including the pneumatic connections therefor.

Figure 10:
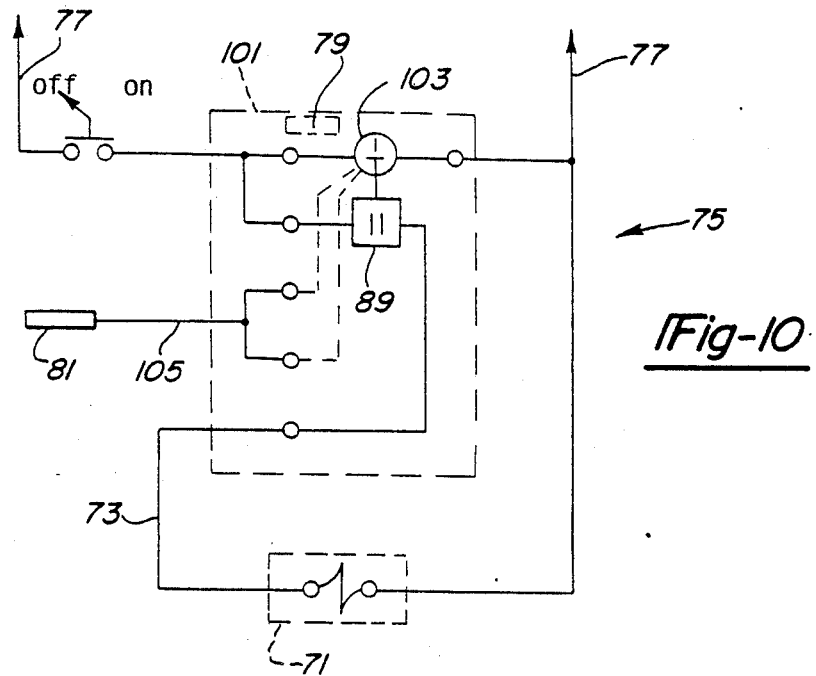

FIG. 10 is a fragmentary schematic electrical diagram showing further details of the diagram of FIG. 7.

It will be understood that the above drawings illustrate a preferred embodiment of the invention, and that other embodiments are contemplated within the scope of the claims hereafter set forth.

DETAILED DESCRIPTION OF AN EMBODIMENT

In FIG. 2 portions of the die set or die set assembly 13 are fragmentarily shown. The lower die shoe is designated at 15 and an upper die shoe is designated at 17. Guide sleeve or bushing 19, having a bore 21 and a central longitudinal axis 23 is press fitted into bore 25 formed in die shoe 15.

The axially aligned guide post 27, fragmentarily shown, having a corresponding longitudinal axis 23 and an elongated lateral guideslot 28, is press fitted within aperture 29 in upper die shoe 17. Cage 31, hereafter sometimes referred to as a ball bearing retainer, is of cylindrical form and includes a series of longitudinally spaced circles of apertures 33 within which are nested and retained a plurality of spaced ball bearings 35. The ball bearings are circularly arranged and project inwardly and outwardly respectively, of the ball cage and are engagable with post 27 and with the bore 21 of bushing or guide sleeve 19.

In the normal operation of the illustrative embodiment the guide post, guide sleeve and ball bearing assembly are mounted with respect to die set 13 schematically shown at 15 and 17. Suitable dies and punches, not shown, may be applied respectively. The preload line 36, FIG. 2, extends transversely of the open end of bushing 19. This corresponds to a preload condition wherein with relative movement of guide post 27 downwardly with respect to guide sleeve 19 and with respect to ball bearing cage 31, there is such oversize relationship of the ball bearings 35 with respect to the guide post and guide sleeve of about one thousandths of an inch, for illustration. This creates a preload in the assembled relationship, FIG. 2.

For the purpose of the present disclosure during the phase of operation of the present impulse ball bearing cage and its rotation, there has been such relative movement between the die shoes 15 and 17 such that guide post 27 has been partly lifted above the preload line 36. At this position the ball cage 31 is not constrained frictionally against rotary movement.

The present ball cage 31 includes a longitudinal bore 37, FIG. 2, which terminates in a threaded counterbore 39 adjacent its upper end into which is threaded cap 41. Said cap is apertured to loosely receive guide post 27.

This threaded counterbore is more fully disclosed in applicants copending patent application, Ser. No. 07/644,532 filed Jan. 23, 1991 entitled Guide Sleeve, Guide Post and Improved Ball Bearing Assembly now U.S. Pat. No. 5,096,307.

Cap 43, FIGS. 2, 3 and 4, sometimes referred to as a turbine cap, includes annular body 45 having an axial bore 47 which coincides with the sleeve diameter and has an internal annular top flange 49. Said cap is press fitted over sleeve 19. Set screws 46 may be used to anchor said cap to sleeve 19.

Apertured cap 43 has a bore defined by annular flange 49 which loosely receives ball cage 31, FIGS. 1 and 2. The axial aperture within annular flange 49 defines with ball cage 31 an annular air gap of approximately 0.010".

Plug fitting 51 projects into body 45 of cap 43 and includes a pipe thread 53, FIG. 4. A pressurized air supply 54, FIG. 9, generates pressures in the range of 60 to 100 psi. In the illustrative embodiment this is 80 psi. Said air source is connected to air hose 55, FIGS. 1 and 9. The hose in the illustrative embodiment is constructed of a polyethylene plastic material.

The air supply conduit or hose 55 at one end includes a fitting 56, FIG. 1, which is threaded into plug 51 for communicating pressurized air to the interior of air cap 43.

Figure 5:
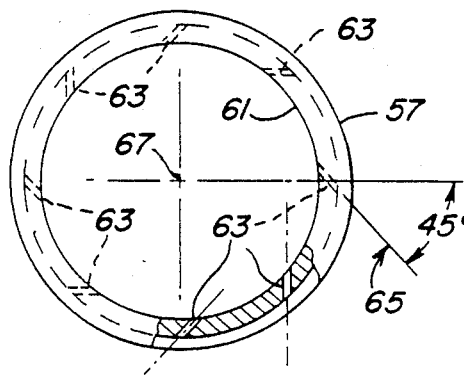
FIG. 5 is a plan view of the turbine ring shown in FIG. 2.

Turbine ring 57, FIGS. 5 and 6, includes an annular body 61 having therein an angular channel 59 for communication with bore 47 within said cap adjacent air inlet 51.

A plurality of angularly related acute angular openings 63 extend through body 61 within the channel 59. These extend inward at the acute angles shown, FIG. 5.

The angular openings, sometimes referred to as tubular openings, are arranged in the illustrative embodiment at a 45 degree angle with respect to a normal extending through the axis 67 of the turbine ring 57, FIG. 5.

The annular channel 59, FIG. 6, in conjunction with bore 47 of cap 45 defines an annular plenum chamber 69 in communication with the impeller type angular passages or opening 63.

Axially apertured turbine ring 57 is nested within the bore 47 of cap 43. The plurality of angularly related turbine openings 63 receive pressurized air from inlet 51 on said cap and deliver said air at an acute angle to and around the surface of cage 31. This rotates said cage relative to sleeve 19 and guide post 27.

The normally closed solenoid control valve 71, sometimes referred to as an air valve, FIGS. 1, 7, 9 and 10, is interposed within air line 55. Said valve controls and permits the flow of pressurized air from source 54 to and through air cap body 45 and through the turbine ring 57 and through the corresponding angular passages 63 for impingement of pressurized air upon exterior surface portions of ball cage 37. This effectively rotates the ball cage, counter clockwise, in the illustrative embodiment.

Air valve 71 is connected into the circuit 75 by lead 73, FIG. 7, and electrical power source 77, 120 volts, AC, further shown in FIG. 9.

Said circuit includes normally open counterswitch 79, which can be preset to close after there has been a predetermined number of relative movements between upper die shoe 17 and lower die shoe 15, FIG. 2, and correspondingly between guide post 27 and guide sleeve 19. For illustration, the counterswitch 79 may be set for 100 such reciprocations after which the counterswitch closes to partly close the electrical circuit 75, FIGS. 7 and 10.

Connected into the circuit is a normally open proximity switch 81 or equivalent limit switch. Said switch is positioned adjacent a portion of the upper die shoe 17, as shown in its uppermost position relative to die shoe 15, FIG. 9. Thus it is desirable that the proximity switch function to close the circuit at a time when the guide post has been sufficiently separated from the guide sleeve 19 and the ball bearing cage 31 of FIG. 2, relative to preload line 36.

Lubricant container 83, FIGS. 1, 9 contains a suitable lubricant sometimes referred by the trademark BALL-LUBE. In the schematic illustration, FIG. 1, hose 85 has an inlet which extends into vented lube container 83. At its other end is connected to atomizer 87 on hose 55 to provide the flow of pressurized atomized lubricant into cap 43.

The electrical circuit further includes an adjustable normally closed timer switch 89, FIGS. 7 and 10, which is preset for a predetermined number of seconds as desired for the flow of pressurized air into cap 45. With air pipe 55 open to pressure air source 54, the normally closed manual air control valve 113, FIG. 9, can regulate the duration of air flow and continued rotations of ball cage 31.

Counterswitch 79, FIG. 7 is identified as a Red Lion Gemini 1,000 counter, model no. GEM-10-000/A manufactured by Red Lion Co, York, Pa.

Proximity Switch 81, FIGS. 9 and 10 is referred to as "Efector Proximity Switch—model no. 8036AL15NL-3DABX, manufactured by Efector Company, King of Prussia, Pa.

The air valve 71 sometimes referred to as Asco air valve is identified as model no. 8210B20-120V.A.C/60 cycle, manufactured by Automatic Switch Company, Florham Park, N.J.

Miniature air filter/regulator 107 is identified as model no. B07-202-AIKA. The regulator 109, Model #18-025-003, and the lubricator 83 referred to as model no. L07-200-MPAA. These are manufactured by C.A. Norgren Company, Littleton, Co.

The assembly of the ball cage 31 with respect to the guide post 27, fragmentarily shown in FIG. 8, includes an internal annular recess 91 within cylindrical ball cage 31, sometimes referred to as a ball bearing cage, and provides a seat for the roller 93. The cage bore 37 terminates in a threaded counterbore 39 at one end. Said bore adjustably receives threaded shank 98 which depends from cap 41. Annular grooved portion 99 at the lower end of shank 98 cooperates with annular recess 91 to supportably receive roller bearing 93.

This construction and the details thereof are set forth in applicant's copending patent application, Ser. No. 07/644,532 filed Jan. 23, 1991 entitled Guide Sleeve, Guide Post and Improved Ball Bearing Assembly.

Longitudinal guide slot 28 extends a portion of the length of guide post 27 and cooperatively receives portions of roller 93. Said roller is adapted for longitudinal movement along the length of slot 28. This limits relative longitudinal movements of ball bearing cage 31 with respect to guide post 27, FIG. 8.

While the roller 93 is constrained to longitudinal movements within guide slot 28, the ball bearing cage 31 and including its slotted portions 91, 99 cooperatively receives portions of the roller. The cage is capable of relative rotary movements with respect to the guide post. This is fully disclosed in the copending patent application and is incorporated hereinto by reference.

According to the diagram shown in FIG. 9, there is provided an electric control panel 101 within which is enclosed the circuit shown in FIG. 10 and including the transformer 103. The transformer 103 through the lead 105, FIGS. 9 and 10, connects with the proximity switch 81. Said switch is normally positioned adjacent upper die shoe 17 when in its raised position relative to lower die shoe 15. It is at this time that the proximity switch 81 is activated or closed and to close the circuit to the air valve 71, assuming the intervening normally open other switches 79, 89 are closed.

These switches include counter 79 which is normally open. It is closed after a preset number of reciprocations of the upper die shoe 17 to the position shown in FIG. 9, such as 100 movements. After that in the manner disclosed, the air valve 71 is opened for applying pressurized air to air cap 43. This effects rotation of ball bearing cage 31. This may be for less than one rotation on several rotations, on partial rotations.

The diagram FIG. 9 includes a manual "on" "off" valve 106 establishing communication with the pressurized air supply 54 which passes through the filter-regulators 107 and 109, lubricator 83 and the intermediate pressure gauge 111.

Pressurized air flows when air valve 71 which has been electronically opened for direction through pipe 55 to cap 43.

Interposed in this circuit also is a manual air control valve 113 wherein air flow is established to said valve. Air through conduit 55 may be manually controlled by manual application of valve 113 for maintaining the flow for the number of seconds desired. This affects a random rotation of ball bearing assembly 31 with respect to guide sleeve 19 and guide post 29.

By the present construction there will be an intermittant rotation of the ball bearing assembly 31 one or a plurality of rotations or for a portion of a rotation. The effect of this rotation is that it will provide a means of reducing tracking of the balls in the ball bearing cage with respect to the guide sleeve and guide post. This provides for less wear of the guide post, guide sleeve and cage and a longer service life of the assembly.

The power supply 77 in the illustrative embodiment to the circuit is shown in FIGS. 7 and 10 is 120 volts AC.

Having described my invention, reference should now be had to the following claims.

I claim:

1. In combination, a guide post having a longitudinal axis and having a longitudinal slot for a portion of its length;
   a cylindrical ball bearing cage having a coaxial longitudinal axis and a bore adjustably receiving said post, and adapted for relative longitudinal and rotary movements thereon;
   said cage mounting a plurality of longitudinally spaced circularly arranged ball bearings projecting inwardly and outwardly thereof, engagable with said post and a guide sleeve respectively;
   a guide sleeve having a coaxial longitudinal axis and a bore adjustably receiving said cage and post;
   a coaxial apertured cap having a bore loosely receiving said cage and mounted over said guide sleeve and retained thereon;
   said cap having an inlet connected to its bore adapted for connection to a compressed air source; and
   an axially apertured turbine ring means fixed within said cap loosely surrounding said cage and including a plurality of angularly related turbine openings for receiving pressurized air from said inlet and impinging pressurized air at an acute angle to and around said cage for rotating said cage relative to said sleeve and post.

2. In the combination of claim 1, further comprising said connection including a tube with a fitting at one end connected to said cap inlet and at its other end connected to said air source.

3. In the combination of claim 2, further comprising a normally closed valve means interposed upon said tube, said valve means when open feeding compressed air to said turbine openings.

4. In the combination of claim 3, further comprising the valve means being a solenoid control valve.

5. In the combination of claim 3, further comprising an electrical circuit connected to a power source and to said valve means to intermittently energize and open said valve means.

6. In the combination of claim 5, further comprising a normally closed adjustable preset timer switch in said circuit to deactivate said valve means after a preset period.

7. In the combination of claim 6, further comprising a normally open counter switch in said circuit for closing said circuit after a preset number of relative movements between said post and sleeve.

8. In the combination of claim 7, further comprising a normally open proximity or limit switch in said circuit adapted to close after a partial separation of said post and sleeve sufficient to release a preload between said post, sleeve and cage.

9. In the combination of claim 5, further comprising a normally open counter switch in said circuit for closing said circuit after a preset number of relative movements between said post and sleeve.

10. In the combination of claim 5, further comprising a normally open proximity or limit switch in said circuit adapted to close after a partial separation of said post and sleeve sufficient to release a preload between said post, cage and sleeve.

11. In the combination of claim 3, further comprising said turbine ring means including an exterior annular channel in registry with said cap bore defining an air plenum, said turbine openings communication with said plenum.

12. In the combination of claim 1, further comprising said air source being compressed air at a pressure in the range of about 60 to 100 PSI.

13. In the combination of claim 1, further comprising said ring openings being arranged in an angle of 45° approximately to a normal line extending through said axis.

14. In the combination of claim 13, further comprising said angle varying in the range of 15° greater and 15° less than said 45° angle, approximately.

15. In the combination of claim 1, further comprising there being an annular recess within the bore of said cage adjacent one end thereof; and
    a truncated roller nested within said recess and positioned within said longitudinal slot.

16. In the combination of claim 15, further comprising a threaded counterbore within said cage at said one end; and
    an apertured cap surrounding said post, threaded into said cage, said cap having a depending shank having an annular grove therein, cooperating with said cage recess for trapping said roller.

17. In the combination of claim 1, further comprising said guide post and guide sleeve being upright and at their ends projected into and respectively secured within the upper and lower relatively movable die shoes of a die set assembly.

18. The method of rotatively indexing a ball bearing cage relative to a guide post and guide sleeve including the steps:
    axially positioning a ball bearing cage upon a guide post for relative longitudinal movements;
    supportably mounting said cage upon said guide post for rotary movements thereon; and
    applying pressurized air to the exterior surface of said cage at an acute angle thereto outwardly of its axis for rotating said cage relative to said guide post.

19. In the method of claim 18 further comprising, positioning said cage partly within an axially aligned guide sleeve;
    said application of pressurized air including directing said pressurized air to an annular plenum surrounding said ball cage and directing a plurality of air streams to and around said cage at acute angles to radial lines through its axis.

20. In the method of claim 18, further comprising before the application of pressure air, the intermediate step of separating said post and sleeve sufficiently to release any preload between said post, sleeve and cage.

* * * * *